United States Patent
Hsu

(10) Patent No.: US 10,681,290 B1
(45) Date of Patent: Jun. 9, 2020

(54) METHOD, IMAGE SENSOR, AND IMAGE PROCESSING DEVICE FOR CROSSTALK NOISE REDUCTION

(71) Applicant: Novatek Microelectronics Corp., Hsinchu (TW)

(72) Inventor: Wei Hsu, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 38 days.

(21) Appl. No.: 16/238,522

(22) Filed: Jan. 3, 2019

(51) Int. Cl.
- *H04N 5/359* (2011.01)
- *H04N 5/369* (2011.01)
- *H04N 5/53* (2006.01)
- *H04B 10/69* (2013.01)

(52) U.S. Cl.
CPC ......... *H04N 5/359* (2013.01); *H04B 10/6931* (2013.01); *H04N 5/36961* (2018.08); *H04N 5/53* (2013.01)

(58) Field of Classification Search
CPC .... H04N 5/359; H04N 5/36961; H04N 3/155; H04N 5/2353; H04N 5/53; H04N 5/52
See application file for complete search history.

(56) References Cited

U.S. PATENT DOCUMENTS

| | | | |
|---|---|---|---|
| 6,704,045 B1* | 3/2004 | Brett | G11B 27/28 348/222.1 |
| 2008/0158431 A1* | 7/2008 | Russell | G09G 3/2022 348/712 |
| 2011/0243464 A1* | 10/2011 | Chida | H04N 19/85 382/232 |
| 2013/0002911 A1 | 1/2013 | Miyashita et al. | |
| 2013/0235252 A1* | 9/2013 | Tseng | H04N 5/23212 348/349 |
| 2015/0195482 A1* | 7/2015 | Wise | H04N 5/772 348/231.99 |
| 2017/0054898 A1* | 2/2017 | Sato | H04N 5/23219 |
| 2018/0288308 A1* | 10/2018 | Furumochi | H04N 5/23293 |

\* cited by examiner

*Primary Examiner* — Hung H Lam
(74) *Attorney, Agent, or Firm* — JCIPRNET

(57) ABSTRACT

A method, an image sensor, and an image processing device for crosstalk noise reduction are proposed. The method is applicable to an image sensor having a sensing array of image sensing elements and PD sensing elements and includes the following steps. A raw image generated by the sensing array is obtained. Whether to compensate image data of a current image pixel among image pixels corresponding to the image sensing elements is determined based on a first condition associated with at least one of an exposure and a system gain of the image sensor, a second condition associated with pixel coordinates of PD pixels corresponding to the PD sensing elements, and a third condition associated with sharpness information of the raw image. The image data of the current image pixel is compensated in response to the three conditions being satisfied. A processed raw image including the compensated image data is generated.

20 Claims, 10 Drawing Sheets

|   |   |   |   |
|---|---|---|---|
| B | G | B | G |
| G | R | G | R |
| B | G | PD | G |
| G | R | G | R |

FIG. 2A

|   |   |   |   |
|---|---|---|---|
| B | G | B | G |
| G | R | PD | |
| B | G | B | G |
| G | R | G | R |

FIG. 2B

|   |   |   |   |
|---|---|---|---|
| B | G | PD | |
| G | R | | |
| B | G | B | G |
| G | R | G | R |

FIG. 2C

METHOD, IMAGE SENSOR, AND IMAGE PROCESSING DEVICE FOR CROSSTALK NOISE REDUCTION

TECHNICAL FIELD

The disclosure relates to a method, an image sensor, and an image processing device for crosstalk noise reduction.

BACKGROUND

The diminutive nature of a modern digital camera allows itself to become a convenient and popular additional feature of portable consumer electronic devices such as smart phones, tablet computers, laptop computers, and so forth. An image sensor including an array of image sensing pixels is used primarily in the digital camera that receives and converts incident light into electrical signals. Some electronic devices may include both image sensing elements as well as phase detection (PD) sensing element within a single image sensor, and such arrangement allows for a pixel-level auto-focusing precision. However, due to manufacturing design constraints and defects, when the incident light is not effectively confined to the generated sensing element, optical crosstalk becomes problematic such that its adjacent sensing elements would then be adversely affected, and thereby causes a degradation of image quality.

SUMMARY OF THE DISCLOSURE

Accordingly, a method, an image sensor, and an image processing device for crosstalk noise reduction are proposed.

According to one of the exemplary embodiments, the method is applicable to an image sensor having a sensing array of image sensing elements and PD sensing elements and includes the following steps. A raw image generated by the sensing array is obtained, where the raw image includes image pixels corresponding to the image sensing elements and PD pixels corresponding to the PD sensing elements. Whether to compensate image data of a current image pixel among the image pixels is determined based on a first condition associated with at least one of an exposure and a system gain of the image sensor, a second condition associated with pixel coordinates of the PD pixels, and a third condition associated with sharpness information of the raw image. The image data of the current image pixel is compensated in response to the first condition, the second condition, and the third condition being satisfied. A processed raw image including the compensated image data of the current image pixel is generated.

According to one of the exemplary embodiments, the image sensor includes a sensing array of image sensing elements and PD sensing elements, a memory circuit, and a processing circuit coupled to the sensing array and the memory circuit. The memory circuit is configured to store data. The processing circuit is configured to: obtain a raw image generated by the sensing array, where the raw image includes image pixels corresponding to the image sensing elements and PD pixels corresponding to the PD sensing elements; determine whether to compensate image data of a current image pixel among the image pixels based on a first condition associated with at least one of an exposure and a system gain of the image sensor, a second condition associated with pixel coordinates of the PD pixels, and a third condition associated with sharpness information of the raw image; compensate the image data of the current image pixel in response to the first condition, the second condition, and the third condition being satisfied; and generate a processed raw image comprising the compensated image data of the current image pixel.

According to one of the exemplary embodiments, the image processing device is connected to an image sensor including a sensing array of image sensing elements and PD sensing elements and includes a memory circuit and a processing circuit coupled to the memory circuit. The memory circuit is configured to store data. The processing circuit is configured to: obtain a raw image generated by the sensing array, where the raw image includes image pixels corresponding to the image sensing elements and PD pixels corresponding to the PD sensing elements; determine whether to compensate image data of a current image pixel among the image pixels based on a first condition associated with at least one of an exposure and a system gain of the image sensor, a second condition associated with pixel coordinates of the PD pixels, and a third condition associated with sharpness information of the raw image; compensate the image data of the current image pixel in response to the first condition, the second condition, and the third condition being satisfied; and generate a processed raw image comprising the compensated image data of the current image pixel.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2A illustrates a schematic diagram of a sensing array with a metal-shielded PD arrangement in accordance with one of the exemplary embodiments of the disclosure.

FIG. 2B illustrates a schematic diagram of a sensing array with a super PD arrangement in accordance with one of the exemplary embodiments of the disclosure.

FIG. 2C illustrates a schematic diagram of a sensing array with a super PD arrangement in accordance with one of the exemplary embodiments of the disclosure.

Figure 1:
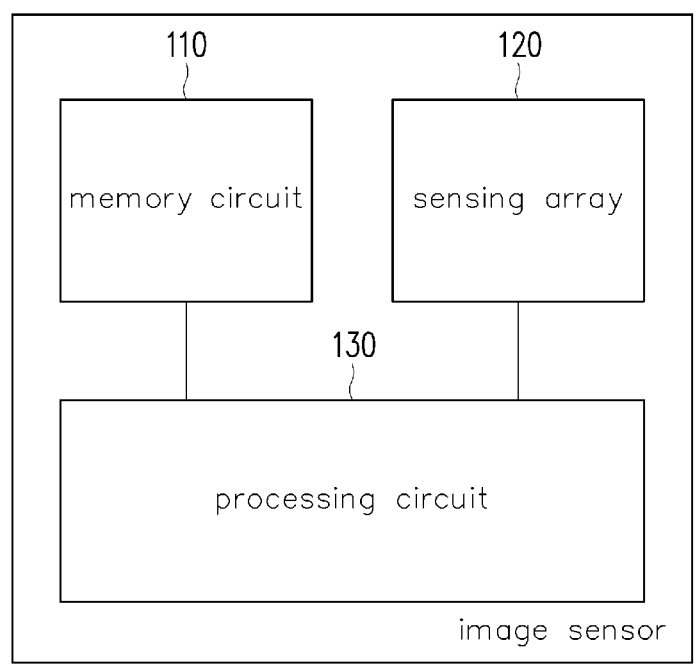
FIG. 1 illustrates a schematic diagram of a proposed image sensor in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image sensor in accordance with one of the exemplary embodiments of the disclosure. All components of the image capturing device and their configurations are first introduced in FIG. 1. The functionalities of the components are disclosed in more detail in conjunction with FIG. 2.

Referring to FIG. 1, an image sensor 100 would include a sensing array 110, a memory circuit 120, and a processing circuit 130. In the present exemplary embodiment, the image sensor 100 may be a complementary metal-oxide semiconductor (CMOS) image sensor of a digital camera, a digital camcorder, a digital single lens reflex camera or other devices provided with an image capturing feature such as a smart phone, a tablet computer, a personal digital assistant, and so forth. In other exemplary embodiments, the image sensor 100 may also be a charge-coupled-device (CCD) image sensor or the like.

The sensing array 110 would include sensing elements arranged in an array. Each of the sensing elements would include three layers, an on-chip lens, a color filter, and a photo diode. The sensing elements would include imaging sensing elements and PD sensing elements. In one exemplary embodiment, each of the PD sensing elements may be partially-shielded by metal or the like (referred to as a metal-shielded PD arrangement). For example, as illustrated in FIG. 2A, a sensing array 210A would be arranged in Bayer pattern with R, G, and B sensing elements, and one B sensing element is partially replaced by a PD sensing element 215A. In another exemplary embodiment, multiple PD sensing elements may be arranged consecutively in a 2×1 or 2×2 arrangement that share a same microlens (referred to as a super PD arrangement). For example, as illustrated in FIG. 2B, a sensing array 210B would be arranged in Bayer pattern with R, G, and B sensing elements, and two adjacent sensing elements would be configured as a PD sensing element 215B. As illustrated in FIG. 2B, a sensing array 210C would be arranged in Bayer pattern with R, G, and B sensing elements, and a quad of sensing elements would be configured as a PD sensing element 215C.

The memory circuit 120 would be configured to store programming codes, device configurations, data, and so forth and may be implemented using any memory technology. The processing circuit 130 would be configured to implement functional elements of the proposed method in the following exemplary embodiments. It should be noted that the image sensor 100 would also include other common essential peripherals such as an analog-to-digital converter (ADC) that receives image signals in an analog form from the sensing array 110, performs analog-to-digital conversion on the image signals, and outputs image signals in a digital form as known per se.

Figure 3:
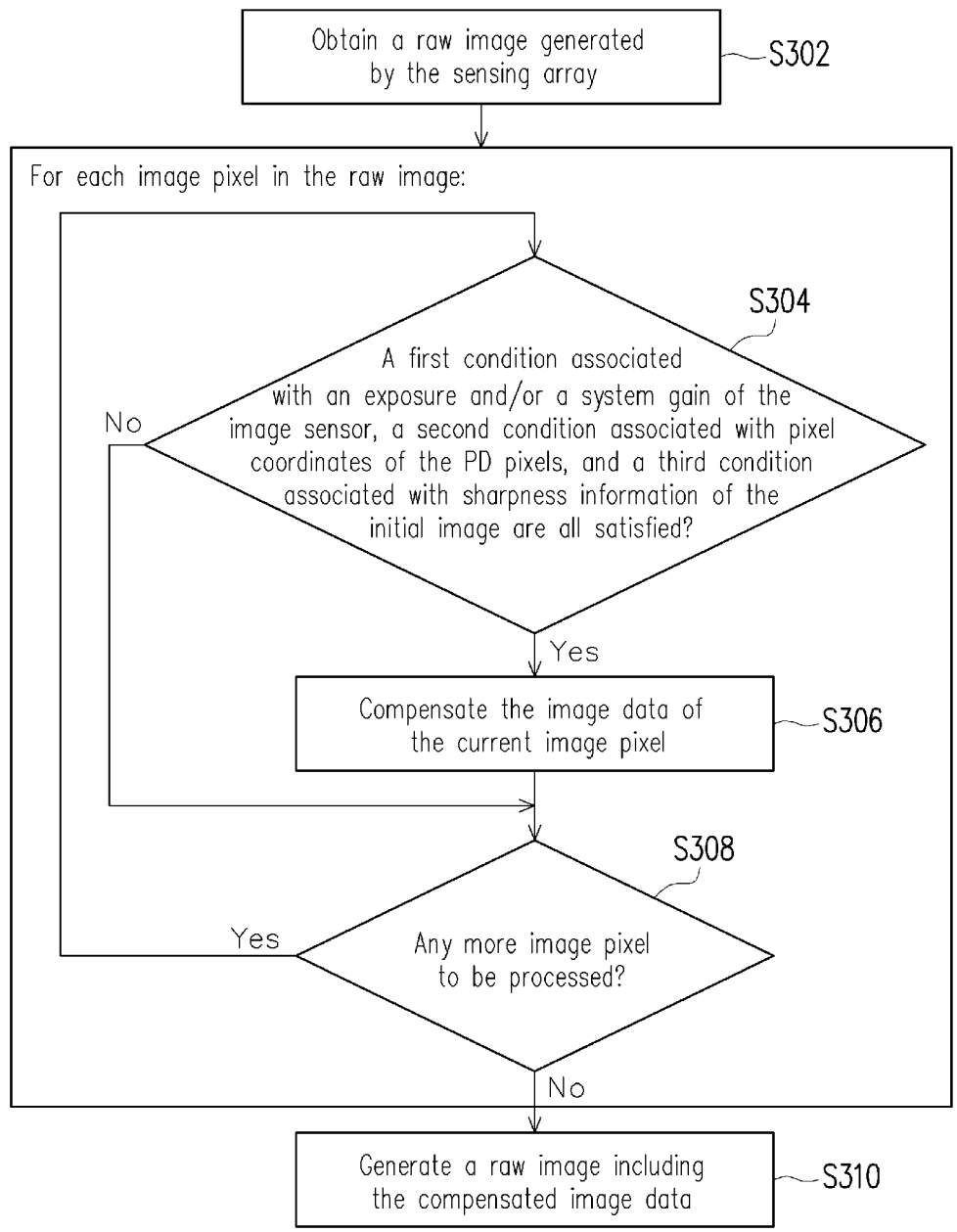
FIG. 3 illustrates a flowchart of a proposed method for crosstalk noise reduction in accordance with one of the exemplary embodiments of the disclosure.

FIG. 3 illustrates a flowchart of a proposed method for crosstalk noise reduction in accordance with one of the exemplary embodiments of the disclosure. The steps of FIG. 3 could be implemented by the proposed image sensor 100 as illustrated in FIG. 1.

Referring to FIG. 1 in conjunction with FIG. 3, the processing circuit 130 would obtain a raw image generated by the sensing array (Step S302), where the raw image would include image pixels corresponding to the image sensing elements and PD pixels corresponding to the PD sensing elements.

Next, for each of the image pixels in the raw image, the processing circuit 130 would determine whether to compensate image data of a current image pixel by determining whether a first condition associated with an exposure and/or a system gain of the image sensor, a second condition associated with pixel coordinates of the PD pixels, and a third condition associated with sharpness information of the raw image are all satisfied (Step S304). The three conditions allow the adaptation of the image sensor 100 to different ambient conditions and scene contexts. As for the first condition, the exposure is the amount of light per unit area reaching the image sensor 100, and the system gain is a multiplier that digitally amplifies the received light level of the image sensor 100. An image captured with short exposure or large system gain may be in a noisy representation, and more artifacts would be produced if the image compensation is performed. As for the second condition, the sensing elements adjacent to the PD pixels would be adversely affected with high potential due to the optical crosstalk, and thus their corresponding image pixels would be candidates for compensation. As for the third condition, since the optical crosstalk would be more noticeable in a smooth region than a complex region, the image pixels in a smooth region would possess a higher priority for compensation. When all the three conditions are satisfied, the processing circuit 130 would compensate the image data of the current image pixel (Step S306). The compensation may be based on other image data of other image pixels in the neighbourhood. More details on Steps 304 and S306 would be provided later on.

Once the compensation is done on the current image pixel, the processing circuit 130 would determine whether there exists any more image pixel in the raw data to be processed (Step S308). When the determination is affirmative, the processing circuit 130 would set a next image pixel as the current image pixel (Step S310) and return to Step S304. When the determination is negative, the processing circuit 130 would generate and output a processed raw image including the compensated image data (Step S312).

The processing circuit 130 may output the processed raw image to another image processing device or circuit such as a digital signal processor (DSP), a central processing unit (CPU), graphics processing unit (GPU) for image compression or any additional image post-processing operations.

Figure 4:
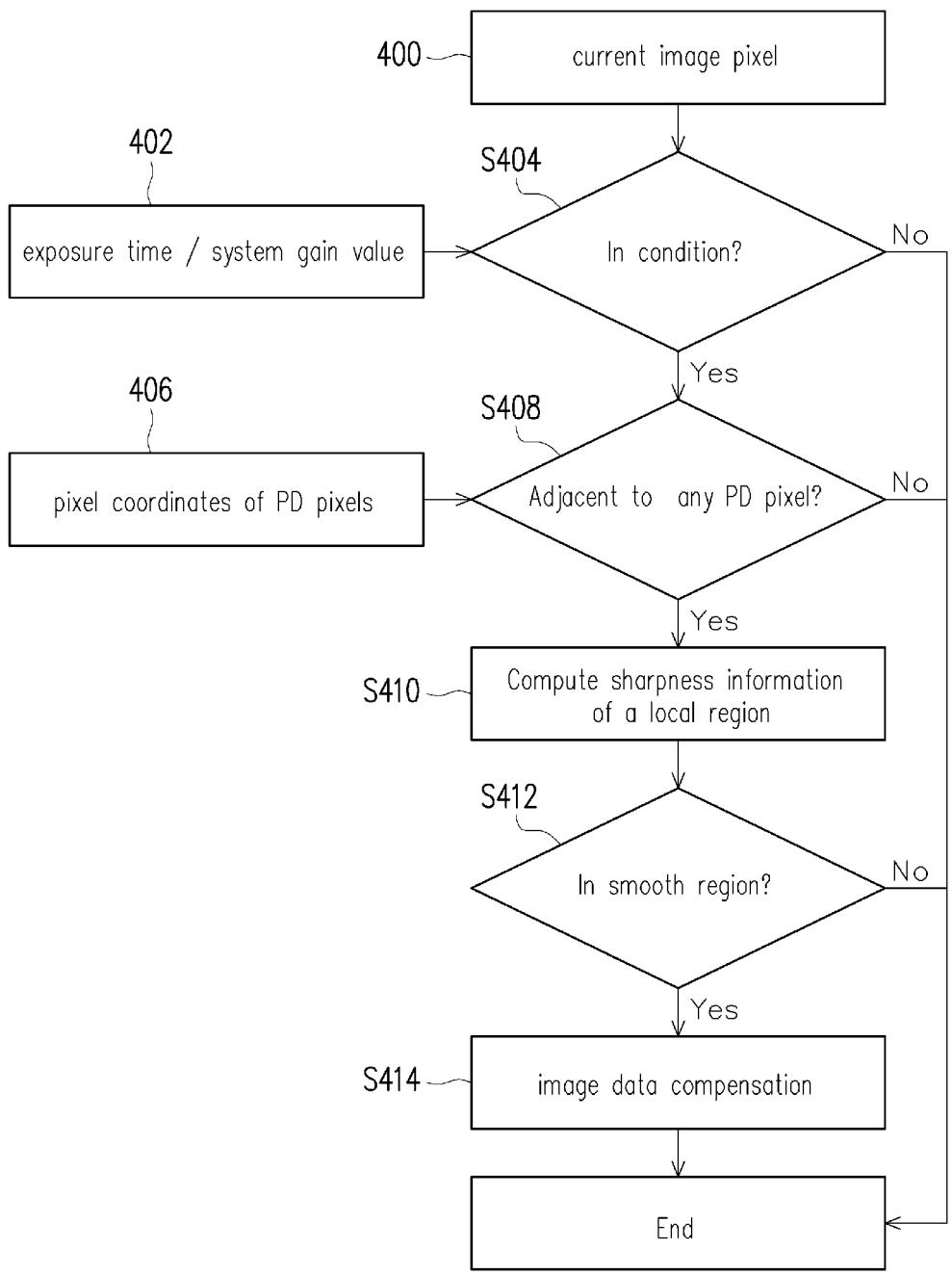
FIG. 4 illustrates a functional diagram of a proposed method for crosstalk noise reduction on a single image pixel in accordance with another one of the exemplary embodiments of the disclosure.

FIG. 4 illustrates a functional diagram of a proposed method for crosstalk noise reduction on a single image pixel in accordance with another one of the exemplary embodiments of the disclosure. The steps of FIG. 4 could be considered as an elaboration of Steps S304 and S306 and could be implemented by the proposed image sensor 100 as illustrated in FIG. 1 as well.

Referring to FIG. 1 in conjunction with FIG. 4, once the processing circuit 130 starts processing a current image pixel 400, it would determine whether an exposure time or a system gain value 402 of the image sensor 100 is in condition (Step S404), that is, determine whether the aforesaid first condition is satisfied. In one exemplary embodiment, the processing circuit 130 may compare the exposure time and a time threshold. When the exposure time is less than the time threshold (i.e. the first condition is not satisfied), this indicates a short exposure time on the image sensor 100, and thus the processing circuit 130 would not compensate the image data of the current image pixel and end the process. In another exemplary embodiment, the processing circuit 130 may compare the system gain value and a gain threshold. When the system gain value is greater than the gain threshold (i.e. the first condition is not satisfied), this indicates a large system gain on the image sensor 100, and thus the processing circuit 130 would not compensate the image data of the current image pixel and end the process.

On the other hand, when the exposure time is greater than or equal to the time threshold, or when the system gain value is less than the gain threshold (i.e. the first condition is satisfied), the processing circuit 130 would determine whether the current image pixel is adjacent to any of the PD pixels (Step S408) according to their pixel coordinates 406, that is, determine whether the aforesaid second condition is satisfied. In other words, the processing circuit 130 would determine whether the current image pixel is an upper pixel, a lower pixel, a left pixel, or a right pixel of any of the PD pixels. Since the PD pixels correspond to the sensing array 120, the pixel coordinates of the PD pixels may be pre-stored in the memory circuit 110 for reference purposes. When the processing circuit 130 determines that the current image pixel is not adjacent to any of the PD pixels (i.e. the second condition is not satisfied), the processing circuit 130 would not compensate the image data of the current image pixel and end the process.

On the other hand, when the processing circuit 130 determines that the current image pixel is adjacent to any of the PD pixels (i.e. the second condition is satisfied), the processing circuit 130 would compute sharpness information of a local region with respect to the current image pixel (Step S410) to accordingly determine whether the current image pixel is within a smooth region (Step S412), that is, determine whether the aforesaid third condition is satisfied. The perception of sharpness is related to the clarity of an image. The relative sharpness of an image may be computed in gray level, spatial-filter, frequency, or probability domains by using different focus value functions. In the present exemplary embodiment, the processing circuit 130 would compute the sharpness information by determining the contrast in the local region with respect to the current image pixel in focus value. Herein, the local region is referred to as a small neighborhood with the current image pixel as a central pixel in the raw image.

In one exemplary embodiment, the processing circuit 130 may compute the focus value by convolving the local region with a Laplacian filter as illustrated in Eq.(1):

$$\begin{cases} FV = \dfrac{1}{N}\sum_x\sum_y |S(x, y)| \\ S(x, y) = L * I(x, y) \\ L = \dfrac{1}{6}\begin{pmatrix} 1 & 4 & 1 \\ 4 & -20 & 4 \\ 1 & 4 & 1 \end{pmatrix} \end{cases} \quad \text{Eq. (1)}$$

Herein, L denotes a 3×3 Laplacian filter. I(x, y) denotes a pixel value (i.e. intensity) of an image pixel at (x, y). S(x, y) denotes a resultant value after convolution. FV denotes the focus value of a local region with a central image pixel (x, y), and N denotes the pixel number in the local region. In another exemplary embodiment, the processing circuit 130 may compute the focus value by a sum-modulus-difference (SMD) measure by summing intensity differences between neighboring pixels in the local region as illustrated in Eq.(2):

$$\begin{cases} SMD_x = \sum_x\sum_y |I(x+1, y) - I(x, y)| \\ SMD_y = \sum_x\sum_y |I(x, y+1) - I(x, y)| \\ FV = SMD_x + SMD_y \end{cases} \quad \text{Eq. (2)}$$

Herein, $SMD_x$ and $SMD_y$ respectively denote the differences along the rows and columns. When the processing circuit 130 determines that the focus value of the local region is greater than a focal value threshold, this indicates that the local region has a large contrast difference, and thus the processing circuit 130 would determine that the current image pixel is not within the smooth region (i.e. the third condition is not satisfied) and would not compensate the image data of the current image pixel and end the process.

On the other hand, when the processing circuit 130 determines that the current image pixel is within the smooth region (i.e. the third condition is satisfied), it would perform image data compensation on the current image pixel (Step S414). Herein, the processing circuit 130 may set a sampling window with respect to the current image pixel, determine sampling image pixels among all other image pixels within the sampling window for compensation according to the arrangement of the PD pixels based on certain rules as provided later on, and compensate the image data of the current image pixel according to the image data of the sampling image pixels. The size of the sampling window may be, for example, 5×5 pixels. In one exemplary embodiment, the sampling pixels may be the image pixels that are not adjacent to any of the PD pixels and having the same color channel as the current image pixel within the sampling window. In another exemplary embodiment, the sampling pixels may be the image pixels that are not adjacent to any of the PD pixels, relatively close to and having the same color channel as the current image pixel within the sampling window. Once the sampling pixels are determined, the processing circuit 130 may compute a median or a weighted average of pixel values of the sampling image pixels to produce the compensated image data of the current image pixel. From another perspective, the current image pixel herein may be considered as a crosstalk-affected pixel, the sampling pixels may be considered as the normal image pixels that possibly correspond to a same object as the current image pixel and would provide more precise image data for image compensation. As a side note, image compensation and pixel sampling would not be formed on any defective pixel (also known as "a bad pixel" without loss of generality.

FIGS. 5A-5D illustrate four sampling windows in metal-shielded PD arrangements in accordance with exemplary embodiments of the disclosure, where some blue image sensing elements are replaced by PD sensing element as mostly configured in the existing image sensors. Also, assume that the current image pixel to be compensated is a green image pixel G50 in the following exemplary embodiments.

Figure 5A:
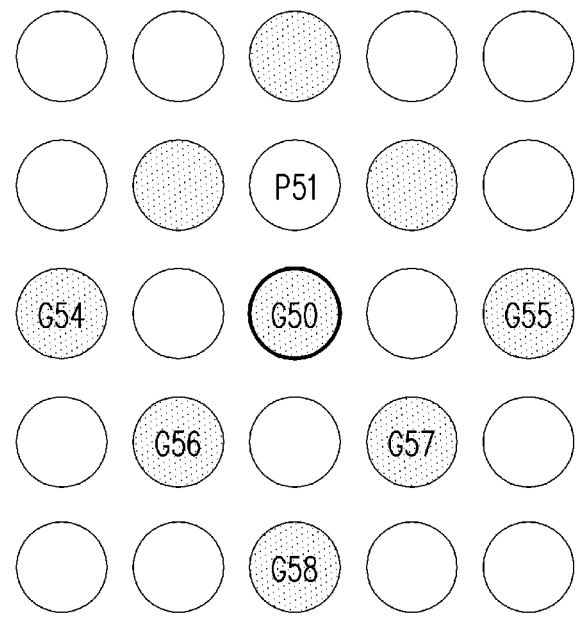
FIGS. 5A-5D illustrate four sampling windows in metal-shielded PD arrangements in accordance with exemplary embodiments of the disclosure.

In FIG. 5A, the green image pixel G50 is adjacently below a PD pixel P51, and the compensated pixel value of the green image pixel G50 may be the median of pixel values of the green image pixels that are close to the image pixel G50 and not adjacent to the PD pixel P51 in the sampling window (e.g. the median of the pixel values of the green image pixels G54, G55, G56, G57, and G58).

Figure 5B:
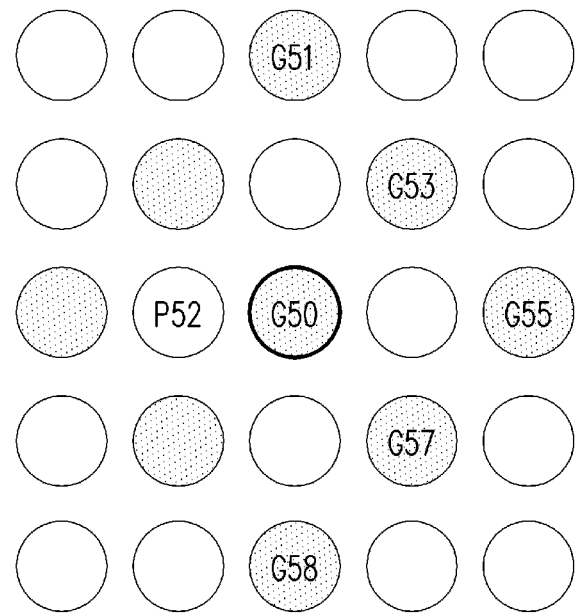

In FIG. 5B, the green image pixel G50 is adjacently right to a PD pixel P52, and the compensated pixel value of the green image pixel G50 may be the median of pixel values of the green image pixels that are close to the image pixel G50 and not adjacent to the PD pixel P52 (e.g. the median of the pixel values of the green image pixels G51, G53, G55, G57, and G58).

Figure 5C:
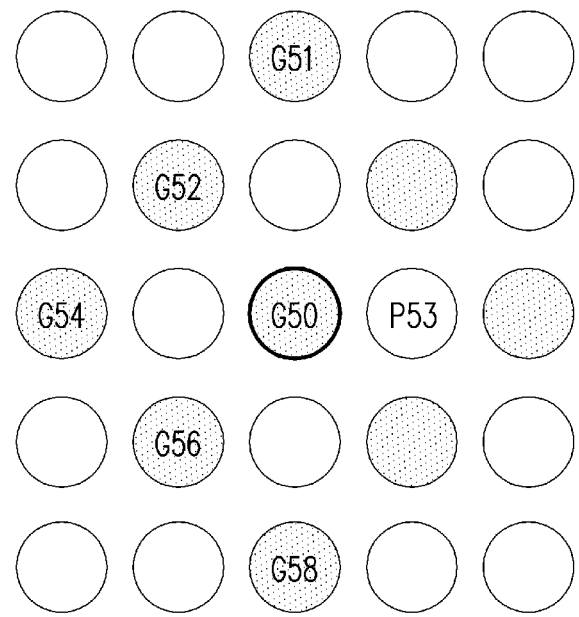

In FIG. 5C, the green image pixel G50 is adjacently left to a PD pixel P53, and the compensated pixel value of the green image pixel G50 may be the median of pixel values of the green image pixels that are close to the image pixel G50 and not adjacent to the PD pixel P53 (e.g. the median of the pixel values of the green image pixels G51, G52, G54, G56, and G58).

Figure 5D:
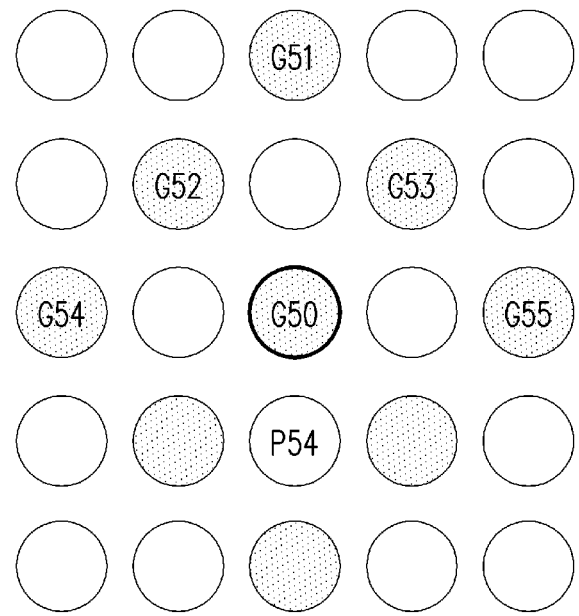

In FIG. 5D, the green image pixel G50 is adjacently above a PD pixel P54, and the compensated pixel value of the green image pixel G50 may be the median of pixel values of the green image pixels that are close to the image pixel G50 and not adjacent to the PD pixel P54 (e.g. the median of the pixel values of the green image pixels G51, G52, G53, G54, and G55).

Figure 6A:
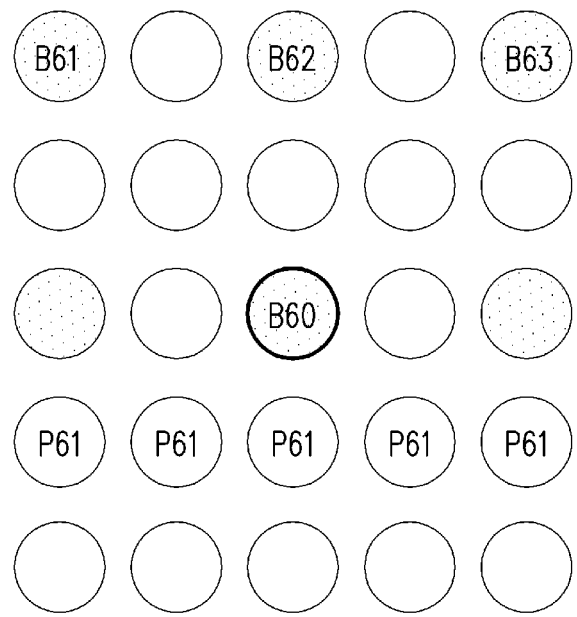
FIGS. 6A-6B illustrate two sampling windows in metal-shielded PD arrangements (in line) in accordance with exemplary embodiments of the disclosure.
Figure 6B:
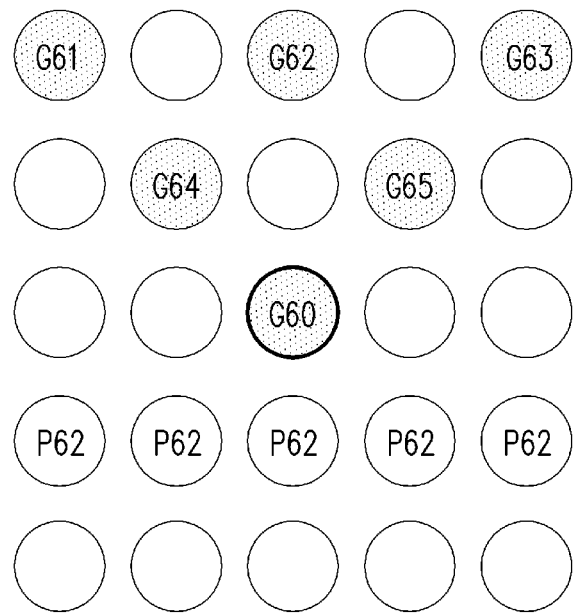

FIGS. 6A-6B illustrate two sampling windows in metal-shielded PD arrangements (in line) in accordance with exemplary embodiments of the disclosure, where an entire row of image sensing elements replaced by PD sensing elements.

In FIG. 6A, assume that the current image pixel to be compensated is a blue image pixel B60. The blue image pixel B60 is adjacently above a row of PD pixels P61, and the compensated pixel value of the blue image pixel B60 may be the average of pixel values of the blue image pixels that are close to the image pixel B50 and not adjacent to the row of PD pixels P61 in the sampling window (e.g. the average of the pixel values of the blue image pixels B61, B62, and B63).

In FIG. 6B, assume that the current image pixel to be compensated is a green image pixel G60. The green image pixel G60 is adjacently above a row of PD pixels P62, and the compensated pixel value of the green image pixel G60 may be the average of pixel values of the green image pixels that are close to the green image pixel G60 and not adjacent to the row of PD pixels P62 in the sampling window (e.g. the average of the pixel values of the green image pixels G61, G62, G63, G64, and G65).

Figure 7A:
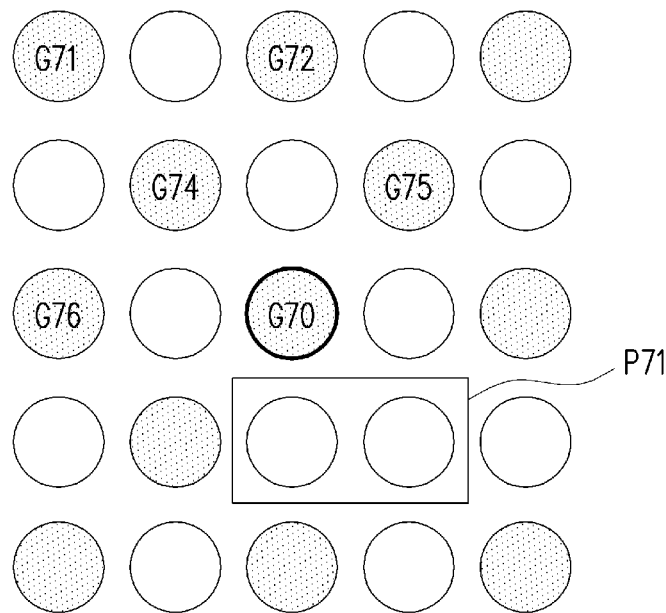
FIGS. 7A-7B illustrate two sampling windows in 1×2 super PD arrangements in accordance with exemplary embodiments of the disclosure.
Figure 7B:
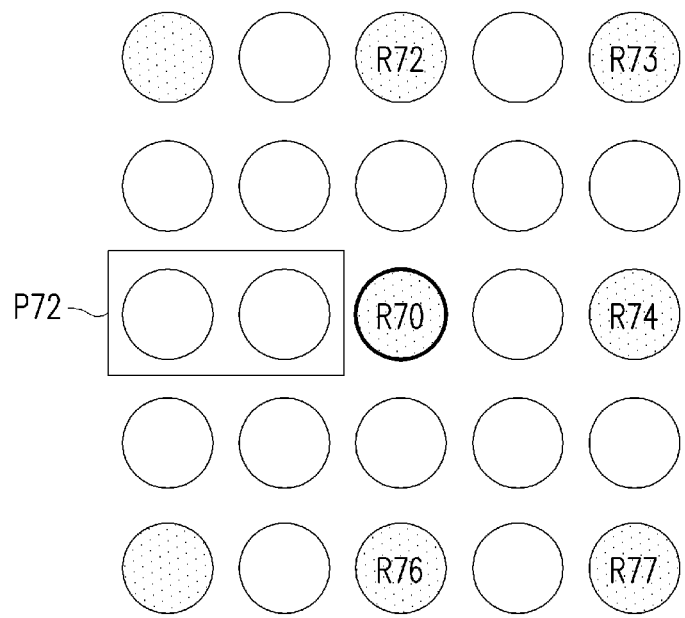

FIGS. 7A-7B illustrate two sampling windows in 1×2 super PD arrangements in accordance with one of exemplary embodiments of the disclosure, where two adjacent sensing elements are configured as a super PD sensing element.

In FIG. 7A, assume that the current image pixel to be compensated is a green image pixel G70. In one exemplary embodiment, the green image pixel G70 is adjacently above a super PD pixel P71, and the compensated pixel value of the green image pixel G70 may be the average of pixel values of all the green image pixels that are close to the green image pixel G70 and not adjacent to the super PD pixel P71 in the sampling window (e.g. the average of the pixel values of the green image pixels G71, G72, G74, G75, and G76).

In FIG. 7B, assume that the current image pixel to be compensated is a red image pixel R70. In one exemplary embodiment, the red image pixel R70 is adjacently right to a super PD pixel P72, and the compensated pixel value of the red image pixel R70 may be the average of pixel values of all the red image pixels that are close to the red image pixel R70 and not adjacent to the super PD pixel P72 in the sampling window (e.g. the average of the pixel values of the red image pixels R72, R73, R74, R76, and R77).

Figure 8A:
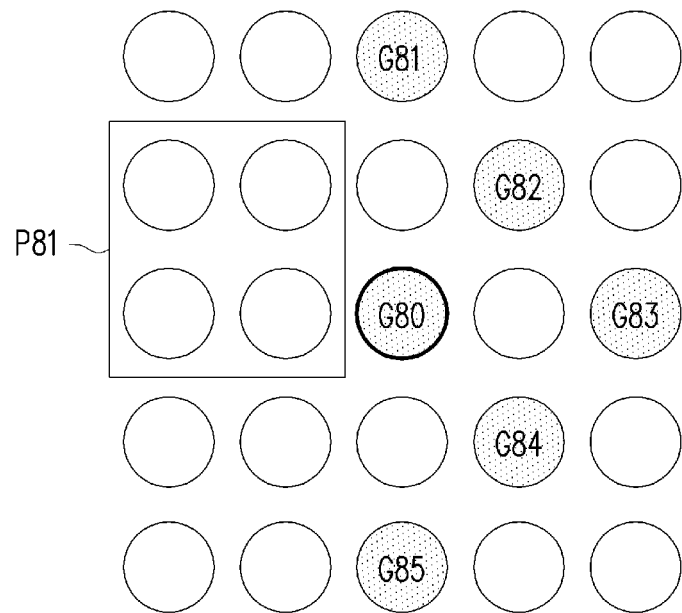
FIGS. 8A-8B illustrate two sampling windows in 2×2 super PD arrangements in accordance with exemplary embodiments of the disclosure.
Figure 8B:
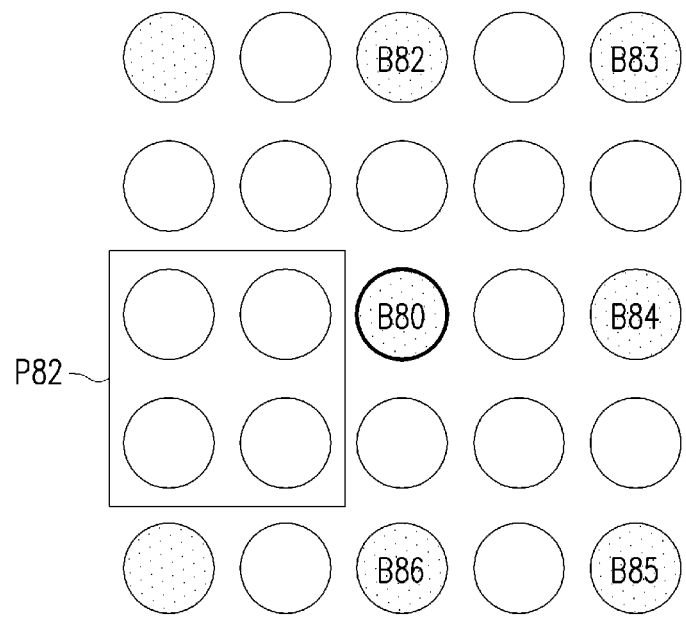

FIGS. 8A-8B illustrate two sampling windows in 2×2 super PD arrangements in accordance with exemplary embodiments of the disclosure, where 2×2 adjacent sensing elements are configured as a super PD sensing element.

In FIG. 8A, assume that the current image pixel to be compensated is a green image pixel G80. In one exemplary embodiment, the green image pixel G80 is adjacently right to a super PD pixel P81, and the compensated pixel value of the green image pixel G80 may be the average of pixel values of the green image pixels that are close to the green image pixel G80 and not adjacent to the super PD pixel P81 in the sampling window (e.g. the average of the pixel values of the green image pixels G81, G82, G83, G84, and G85).

In FIG. 8B, assume that the current image pixel to be compensated is a blue image pixel B80. In one exemplary embodiment, the blue image pixel B80 is adjacently right to a super PD pixel P82, and the compensated pixel value of the blue image pixel B80 may be the average of pixel values of the blue image pixels that are close to the blue image pixel B70 and not adjacent to the super PD pixel P82 in the sampling window (e.g. the average of the pixel values of the blue image pixels B82, B83, B84, B85, and B86).

Figure 9:
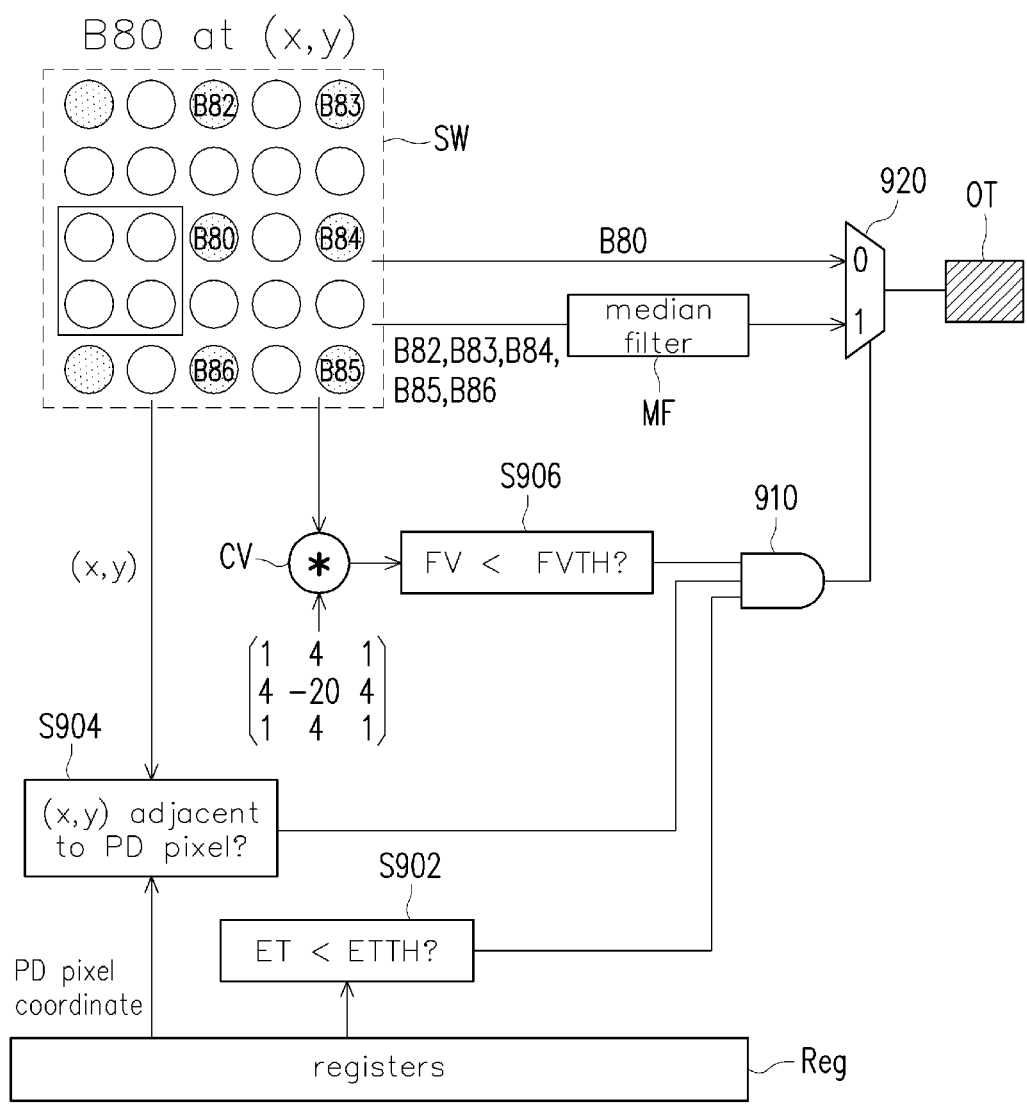
FIG. 9 illustrate a functional diagram of a proposed method for crosstalk noise reduction with actual implementation in accordance with one of the exemplary embodiments of the disclosure.

For a better overall comprehension, FIG. 9 illustrate a functional diagram of a proposed method for crosstalk noise reduction with actual implementation in accordance with one of the exemplary embodiments of the disclosure. Herein, a sampling window SW with respect to the blue image pixel B80 with a pixel coordinate (x, y) as a current image pixel is illustrated.

Referring to FIG. 9, whether an exposure time ET of an image sensor is less than a time threshold ETTH is determined (Step S902), and whether the current image pixel is adjacent to any of the PD pixels is determined according to the pixel coordinate (x, y) and PD pixel coordinates stored in registers Reg (Step S904). Also, whether a focus value FV computed by a convolution kernel CV is less than a focus value threshold FVTH is determined (step S906). The determination results of Steps 902, S904, and S906 are collected by a logic circuit 910 and sent to a multiplexer 920. If the determination results indicate that all conditions are satisfied, the median of the blue image pixels B82-B86 (i.e. sampling pixels) are computed by a median filter MF as a compensated image data of the blue image pixel B80, and the compensated image pixel OT is output by the multiplexer 920.

It should also be noted that, in one exemplary embodiment, a memory circuit and a processing circuit respectively similar to the memory circuit 120 and the processing circuit 130 would be included in an image processing device external and connected to an image sensor, e.g. an image signal processor (ISP). In such scenario, the image sensor merely captures a raw image and the image processing device would perform the proposed method.

In view of the aforementioned descriptions, the proposed method and image sensor, and image processing device introduce an image compensation technology to reduce optical crosstalk due to manufacturing design constraints and defects on a sensing array with a configuration of both image sensing elements and PD sensing elements in an effective and elegant fashion.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for crosstalk noise reduction, applicable to an image sensor having a sensing array of a plurality of image sensing elements and a plurality of phase detection (PD) sensing elements, comprising:
    obtaining a raw image generated by the sensing array, wherein the raw image comprises a plurality of image pixels corresponding to the image sensing elements and a plurality of PD pixels corresponding to the PD sensing elements;
    determining whether to compensate image data of a current image pixel among the image pixels based on a first condition associated with at least one of an exposure and a system gain of the image sensor, a second condition associated with pixel coordinates of the PD pixels, and a third condition associated with sharpness information of the raw image;
    compensating the image data of the current image pixel in response to the first condition, the second condition, and the third condition being satisfied; and
    generating a processed raw image comprising the compensated image data of the current image pixel.

2. The method according to claim 1, the step of determining whether to compensate the image data of the current image pixel based on the first condition associated with at least one of the exposure and the system gain of the image sensor comprises:
    comparing an exposure time of the image sensor and a time threshold; and
    determining that the first condition is not satisfied and not compensating the image data of the current image pixel in response to the exposure time of the image sensor being less than the time threshold.

3. The method according to claim 1, the step of determining whether to compensate the image data of the current image pixel based on the first condition associated with at least one of the exposure and the system gain of the image sensor comprises:
    comparing a system gain value of the image sensor and a gain threshold; and
    determining that the first condition is not satisfied and not compensating the image data of the current image pixel in response to the system gain value of the image sensor being greater than the gain threshold.

4. The method according to claim 1, wherein the step of determining whether to compensate the image data of the current image pixel based on the second condition associated with the pixel coordinates of the PD pixels comprising:
    determining whether the current image pixel is adjacent to any of the PD pixels according to the pixel coordinates thereof; and
    determining that the second condition is not satisfied and not compensating the image data of the current image pixel in response to the image pixel not being adjacent to any of the PD pixels.

5. The method according to claim 4, wherein the step of determining whether the current image pixel is adjacent to any of the PD pixels according to the pixel coordinates thereof comprising:
    determining whether the current image pixel is an upper pixel, a lower pixel, a left pixel, or a right pixel of any of the PD pixels according to the pixel coordinates thereof so as to determine whether the current image pixel is adjacent to any of the PD pixels.

6. The method according to claim 1, wherein the step of determining whether to compensate the image data of the current image pixel based on the third condition associated with the sharpness information of the raw image:
    computing the sharpness information of a local region with respect to the current image pixel;
    determining whether the current image pixel is within a smooth region according to the sharpness information of the local region with respect to the current image pixel; and
    determining that the third condition is not satisfied and not compensating the image data of the current image pixel in response to the current image pixel not being within the smooth region.

7. The method according to claim 1, wherein the step of compensating the image data of the current image pixel in response to the first condition, the second condition, and the third condition being satisfied comprises:
    setting a sampling window with respect to the current image pixel;
    determining sampling image pixels among a plurality of other image pixels within the sampling window for compensation according to an arrangement of the PD pixels;
    compensating the image data of the current image pixel according to image data of the sampling image pixels.

8. The method according to claim 7, wherein the step of determining the sampling image pixels among the other image pixels within the sampling window for compensation according to the arrangement of the PD pixels comprises:
  determining a color channel of the current image pixel; and
  selecting the other image pixels that are not adjacent to any of the PD pixels and having the same color channel as the current image pixel within the sampling window as the sampling image pixels.

9. The method according to claim 7, wherein the step of determining the sampling image pixels among the other image pixels within the sampling window for compensation according to the arrangement of the PD pixels comprises:
  determining a color channel of the current image pixel; and
  selecting the other image pixels that are not adjacent to any of the PD pixels, close to and having the same color channel as the current image pixel within the sampling window as the sampling image pixels.

10. The method according to claim 7, wherein compensating the image data of the current image pixel according to image data of the sampling image pixels comprises:
  computing a median or a weighted average of pixel values of the sampling image pixels to produce the compensated image data of the current image pixel.

11. The method according to claim 1, wherein the PD sensing elements are in a metal-shielded PD arrangement.

12. The method according to claim 1, wherein the PD sensing elements are in a super PD arrangement.

13. The image sensor according to claim 11, wherein the processing circuit sets a sampling window with respect to the current image pixel, determines sampling image pixels among a plurality of other image pixels within the sampling window for compensation according to an arrangement of the PD pixels, and compensates the image data of the current image pixel according to image data of the sampling image pixels.

14. The image sensor according to claim 13, wherein the processing circuit determines a color channel of the current image pixel, and selects the other image pixels that are not adjacent to any of the PD pixels and having the same color channel as the current image pixel within the sampling window as the sampling image pixels.

15. The image sensor according to claim 13, wherein the processing circuit determines a color channel of the current image pixel, and selects the other image pixels that are not adjacent to any of the PD pixels, close to and having the same color channel as the current image pixel within the sampling window as the sampling image pixels.

16. The image sensor according to claim 13, wherein the processing circuit computes a median or a weighted average of pixel values of the sampling image pixels to produce the compensated image data of the current image pixel.

17. An image sensor comprising:
  a sensing array of a plurality of image sensing elements and a plurality of phase detection (PD) sensing elements;
  a memory circuit, configured to store data;
  a processing circuit, coupled to the sensing array and the memory circuit, configured to:
    obtain a raw image generated by the sensing array, wherein the raw image comprises a plurality of image pixels corresponding to the image sensing elements and a plurality of PD pixels corresponding to the PD sensing elements;
    determine whether to compensate image data of a current image pixel among the image pixels based on a first condition associated with at least one of an exposure and a system gain of the image sensor, a second condition associated with pixel coordinates of the PD pixels, and a third condition associated with sharpness information of the raw image;
    compensate the image data of the current image pixel in response to the first condition, the second condition, and the third condition being satisfied; and
    generate a processed raw image comprising the compensated image data of the current image pixel.

18. The image sensor according to claim 17, wherein the PD sensing elements are in a metal-shielded PD arrangement.

19. The image sensor according to claim 17, wherein the PD sensing elements are in a super PD arrangement.

20. An image processing device, connected to an image sensor having a sensing array of a plurality of image sensing elements and a plurality of phase detection (PD) sensing elements, comprising:
  a memory circuit, configured to store data;
  a processing circuit, coupled to the memory circuit, configured to:
    obtain a raw image generated by the sensing array, wherein the raw image comprises a plurality of image pixels corresponding to the image sensing elements and a plurality of PD pixels corresponding to the PD sensing elements;
    determine whether to compensate image data of a current image pixel among the image pixels based on a first condition associated with at least one of an exposure and a system gain of the image sensor, a second condition associated with pixel coordinates of the PD pixels, and a third condition associated with sharpness information of the raw image;
    compensate the image data of the current image pixel in response to the first condition, the second condition, and the third condition being satisfied; and
    generate a processed raw image comprising the compensated image data of the current image pixel.

* * * * *